June 24, 1947.  G. TOOBY  2,422,706
DESICCATING METHOD AND APPARATUS
Original Filed Dec. 7, 1940  2 Sheets-Sheet 1
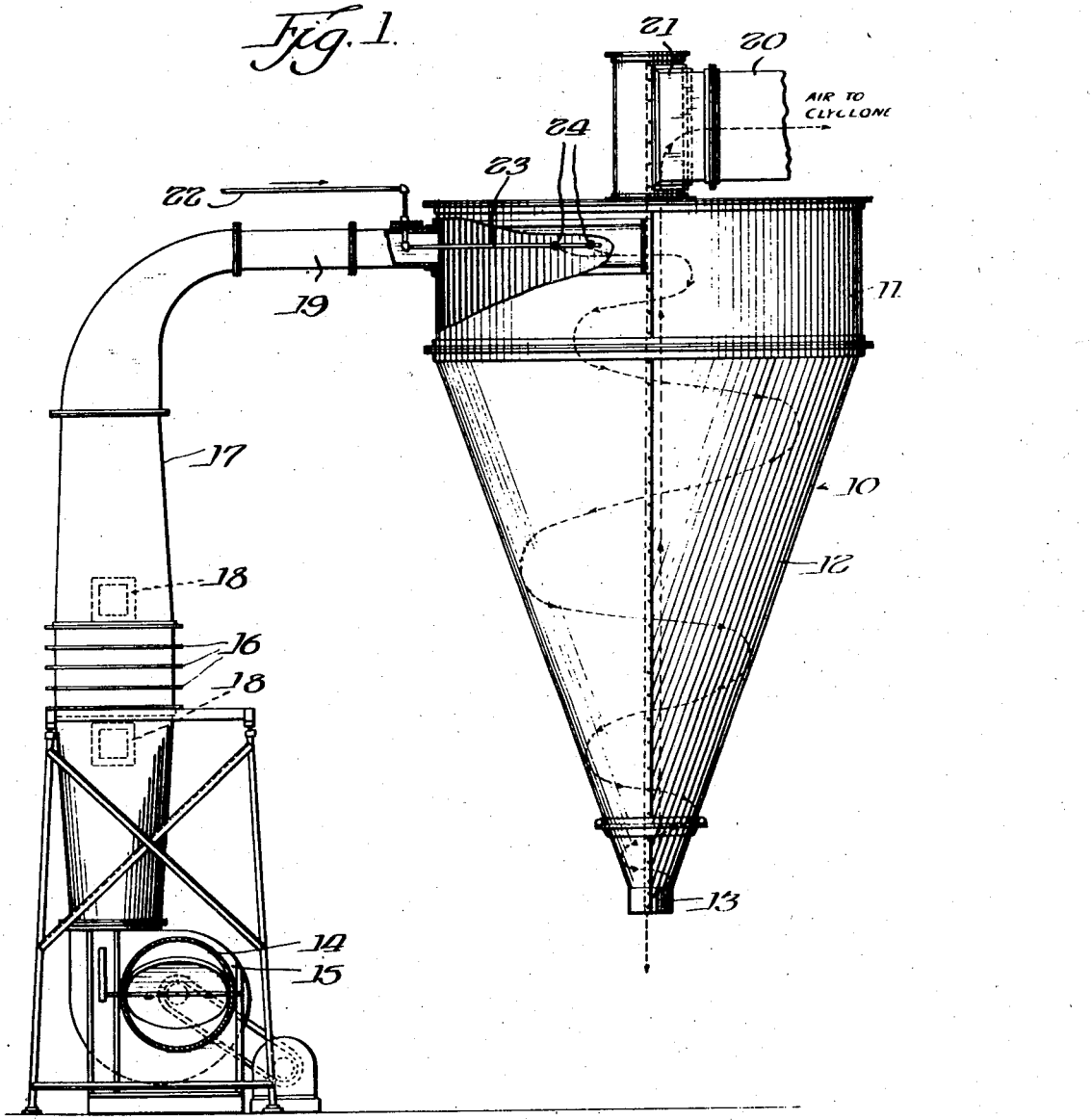
Inventor:
George Tooby
By William H. Abbott
Atty.

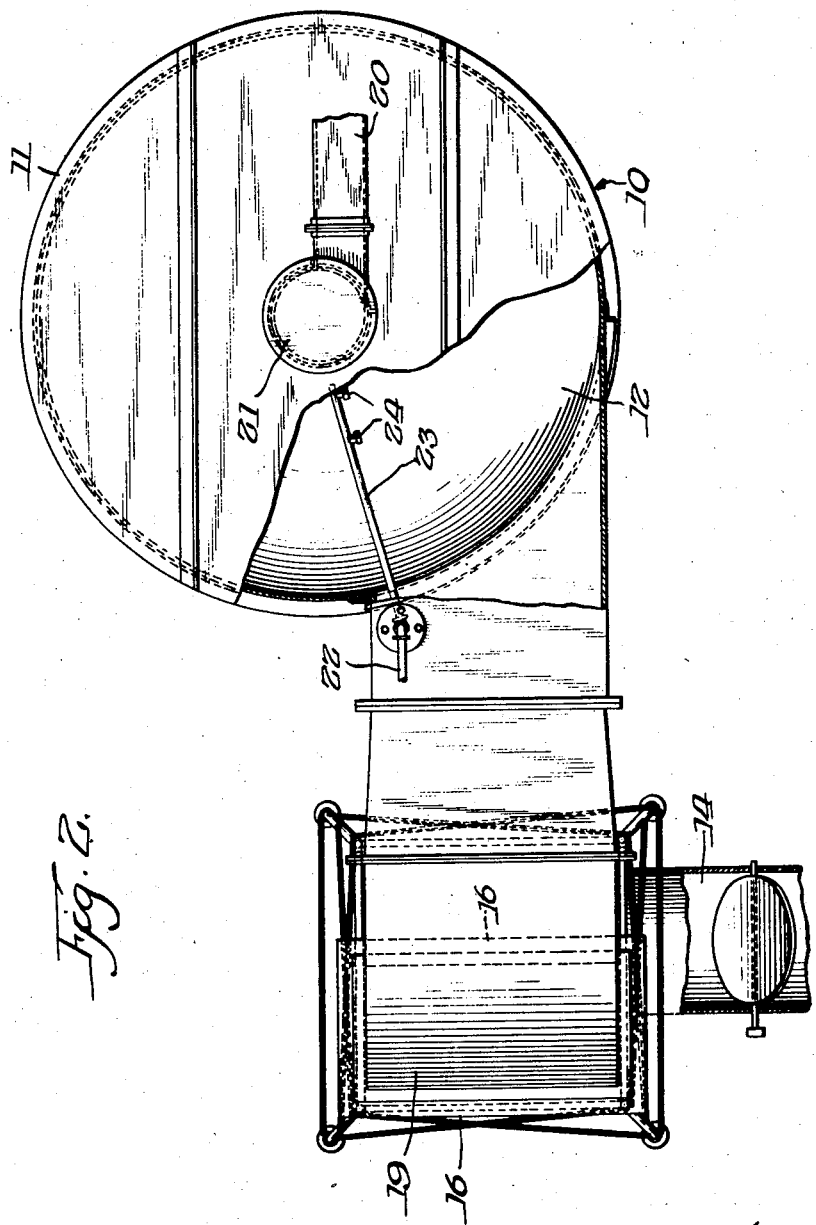

Patented June 24, 1947

2,422,706

UNITED STATES PATENT OFFICE 2,422,706

DESICCATING METHOD AND APPARATUS

George Tooby, Prentice, Wis., assignor to Richard C. Lilly, St. Paul, Minn.

Original application December 7, 1940, Serial No. 369,046. Divided and this application February 9, 1942, Serial No. 430,055

10 Claims. (Cl. 159—4)

This invention relates generally to methods and apparatus for desiccating various heat-sensitive food products whereby food substances normally in liquid form can be converted into finely divided solid products with a minimum thermal damage to their natural properties. The invention relates particularly to the methods and apparatus for the production of whole milk powder, cream powder or skim milk powder which contain all the solid ingredients of milk in substantially their natural condition and which, upon the addition of water, will be readily restored to milk which is practically identical to the fresh untreated material. The invention may also be utilized in the drying of malted milk, tomato paste, eggs, and similar heat-sensitive food products.

The present application is a division of my copending application Serial No. 369,046, filed December 7, 1940, in which a complete method and the apparatus for carrying it out, for rapidly concentrating in an improved horizontal multiple-effect evaporator and drying at relatively high temperatures such heat-sensitive food substances, is disclosed. The present application relates to method and apparatus for drying heat-sensitive materials which preferably have been previously concentrated either in evaporating apparatus of the type disclosed in my copending application or other suitable evaporating apparatus, although it is to be understood that the present methods and apparatus are not limited to use on previously concentrated liquid substances but may be employed to desiccate unconcentrated liquid substances.

A particular object of the invention is the construction of spray drying apparatus enabling the production of a superior product of low moisture content in a single drying chamber of small dimensions employing high-temperature, short-time drying with the material flowing at first transversely and then parallel to the flow of the drying fluid. A further object is the construction of an improved drier in which any unit portion of the product is present for three minutes or less and in which the greater portion of the product is present for only a few seconds.

While apparatus for drying fluid substances such as milk by atomizing them into an atmosphere of heated air or other gases is quite old, such apparatus in every case comprises large and expensive installations of equipment economically unsuitable for use except in a few highly developed dairy areas. A further object of this invention, therefore, is to provide spray drying methods and apparatus which will be as practical for small capacity units as for large capacity units and will make the advantages of spray drying available in the small plants. A further object of the invention is the production of a completely soluble whole milk powder in which the moisture content is not more than 2.25%.

Referring to the drawings in which a preferred embodiment of the invention is illustrated:

Fig. 1 is an elevational view, partially in cross-section, of my improved spray drier; and Fig. 2, a plan view, partially in section, of the drier, fan and atomizer.

In the drawings, the reference character 10 indicates the drying chamber which may comprise an upper cylindrical portion 11 and a lower conical portion 12 terminating in a constricted outlet 13 provided with a canvas stocking or other means of regulating the flow of the desiccated material. The upper cylindrical chamber 11 is preferably of substantial diameter with respect to its height. Adjacent the drying chamber is a source of heated air which may comprise an air inlet 14, a motor driven fan 15, a plurality of radiators 16 disposed in an air duct 17 provided with access doors 18. The air duct 17 extends upwardly from the radiator 16 and terminates in a horizontally disposed portion 19, which is relatively wide in respect to its height and extends tangentially into the upper midsection of the cylindrical chamber 11.

An air outlet 20 has a tangential head 21 disposed above a central portion of the cylindrical portion 11 and opening thereinto. The air outlet leads to one or more cyclone dust collectors, not shown, and which may be of a conventional type provided with an upper air outlet and a lower outlet from which entrained desiccated particles may be removed.

The material to be dried, such as concentrated milk, is introduced into the spray drier by a high pressure pump (not shown) through the pipe 22 leading from a storage tank or when the drier is employed in connection with the complete system shown in my parent application, Serial No. 369,046, from the evaporating apparatus through a homogenizing valve. The pipe 22 preferably is led through the air duct 19 and extends inwardly toward the center of the cylindrical chamber 11, although if desired the liquid inlet pipe 22 may be terminated at the edge of the chamber 11. The extension 23 of the pipe 22 within the air chamber is pivotally mounted so that the concentrated milk may be sprayed at an angle to the direction of flow of the stream of incoming heated air, if desired, and is provided along its side with one or more spray nozzles 24 adapted to discharge into the heated air stream. The nozzles 24 are provided with orifices adapted to spray the concentrated milk into the air stream in finely divided form. In small units, only one nozzle need be employed, while in larger units two or more nozzles 24 are disposed on the side of the pipe 23 in spaced position.

In operation, the air entering the cylindrical chamber 11 through the duct 19 may be at a temperature of 280–350° F. and passes the spray nozzle 24 at a rapid velocity, for example, of about 2,000 feet per minute. The concentrated milk leaving the nozzle 24 in the form of a spray is carried along with the hot incoming air, without touching the walls of the chamber 11 until it is well inside the chamber. The milk spray gradually travels across the incoming air stream, due to the centrifugal force on the spray and its initial velocity, and at the same time is gradually carried around the chamber and then is subsequently carried downwardly by the air current. While the particles of concentrated milk are carried outwardly somewhat, the air flow into the cylindrical chamber 11 does not impart swirling movement of such intensity as to cause the particles to be immediately drawn outwardly against the walls of the chamber, nor does the air flow impart an immediate downward velocity to the particles as to cause them to be discharged downwardly from the chamber 11 without proper treatment therein. The milk particles as shown in Fig. 1 travel in a downward spiral of increasing diameter, continuously leaving behind a zone of saturated or partially saturated air entering a zone of less saturated and hotter air until the particles strike the walls of the conical chamber 12 and then they travel in a downward spiral of decreasing diameter following the walls of the conical chamber until they reach its apex. It has been found that this apparatus dries whole milk concentrate rapidly and continuously to a dry powder of approximately 2% or less moisture well before the downwardly spiral air current approaches the apex of the conical chamber 12. The air current spirals downwardly to the apex of the chamber 12, where substantially all of the powder is removed and then rises in an internal spiral to the head 21 above the cylindrical chamber 11 which it enters at a temperature of around 190° F. due to the heat loss by the rapid evaporation of the milk spray to the dry particle form. The greater portion of the milk particles separate from the air stream in the lower portion of the conical chamber 12 and are discharged through the outlet 13. One half of one per cent or less of the milk particles are entrained in the rising air stream and these are separated therefrom in the cyclone dust collectors, not shown.

The milk introduced into the drier body through the pipe 22 is preferably heated and may be at a temperature of 120°–170° F. To obtain a milk powder having a moisture content of not more than 2%, it is desirable to control the moisture content of the air within the drier body, and it is desirable that the vapor pressure of the water in the air does not exceed 1.6 inches of mercury or that the dry bulb temperature of the air within the drier body does not drop below 175° F.

It will thus be seen that the improved drier construction provides parallel air flow drying of a unique type in that during the initial portion of the movement of the concentrated milk spray, the spray gradually moves across the incoming air stream in the cylindrical chamber 11 and is continuously exposed to substantially fresh unsaturated air. The construction also provides maximum length of spray particle flight in relation to the size of the chamber and superior air-mist mixing and powder separation in a single body. The whole milk concentrate is thus rapidly dried to a dry powder and the powder is rapidly separated from the air, and since the dried particles are removed rapidly and continuously from the drying unit, no portion of the milk solids is more than briefly exposed to the high temperatures of the air stream, which would be harmful if prolonged.

The improved spray drier construction forms an important component of my improved system of producing dry milk powder, in that, due to its high temperature operations for a very short period without thermal damage to the milk solids, I am enabled to concentrate the liquid milk to a higher degree than would otherwise be possible, which results in considerable saving in the cost of operation since it costs seven times as much to remove water by air evaporation as it does to remove water by means of the four effect vacuum evaporator described in my copending application. It is to be understood, however, that the spray drier construction has considerable utility wherever the rapid drying of heat-sensitive food substances is desired.

What I claim is:

1. Apparatus for spray drying whole milk, comprising a vertically disposed conical chamber having its vertex at the bottom, a wide shallow duct mounted in an upper portion in said chamber and disposed tangentially thereto for introducing a rapidly moving current of hot air, an air outlet centrally located at the top of said chamber, a spray nozzle for incoming milk to be dried located near the top of said chamber and disposed intermediate the center of said chamber and the inside junction of the air inlet and the conical chamber, said nozzle being directed so as to spray milk against the inside edge of the rapidly moving current of hot air, whereby milk sprayed into the air stream will travel toward the periphery of said chamber and across the incoming air stream, and an outlet for the dried milk particles at the bottom of said chamber.

2. Apparatus for spray drying milk, comprising a vertical drier body having an upper cylindrical chamber and a lower conical portion in open communication with said cylindrical portion, an outlet for dried milk particles at the lower apex end of said chamber, a wide shallow duct entering said cylindrical chamber and adapted to introduce a stream of heated air in a generally horizontal position tangentially into said chamber, a spray nozzle mounted in said cylindrical chamber intermediate the center and periphery thereof, and approximately on a line with the inside edge of said shallow duct, to introduce liquid milk into the edge of the incoming air stream whereby the milk will travel across the incoming air stream and will be carried around and downwardly through the conical chamber by the air stream, and an air outlet centrally located in the top of said cylindrical chamber.

3. Apparatus for spray drying milk, comprising a drier body having an upper cylindrical chamber and a lower conical chamber in open communication, horizontally disposed means for introducing tangentially a stream of heated gas into the upper chamber, an inlet for milk to be dried provided with spray nozzles positioned to project finely divided milk in a generally horizontal direction into said air stream in cross current relation therewith, so that said milk will gradually flow across said air stream and with it around said upper chamber and in downward spirals through said lower chamber, an outlet for milk powder at the bottom of said lower chamber and an air outlet centrally located in the top of said cylindrical chamber.

4. Apparatus for spray drying milk to a moisture content of approximately 2% or less, comprising a vertically disposed drier body having an upper cylindrical chamber of substantial diameter in respect to its height, and a conical chamber disposed below said cylindrical chamber and in open communication therewith and having its apex at its lower end, means for tangentially introducing a rapidly moving stream of heated air into said upper chamber in a horizontal plane, whereby the air stream will travel around the cylindrical chamber and then pass in downward spirals through the conical chamber and subsequently rise through said chambers to an air outlet centrally disposed in the top of said chamber, a pipe for introducing milk to be dried extending toward the center of said upper chamber, and one or more spray nozzles connected in communicating relation with said pipe and adapted to direct finely divided milk particles into said rapidly moving air stream in said upper chamber and toward the cylindrical walls thereof, whereby said milk spray will be carried with said air stream through said upper and lower chamber to the bottom of said lower chamber where the major portion of said milk powder is separated from said air stream.

5. The method of drying in a drier body concentrated milk comprising introducing into the upper portion of said drier body along a generally horizontal plane a rapidly moving stream of heated air so that said stream will first travel in a circular path around the upper portion of said drier body and will then move downwardly in spirals and will subsequently rise through the drier body along its central axis and simultaneously introducing a stream of concentrated milk into said stream of heated air in the same horizontal plane so that the milk particles will move toward the periphery of the drier body and cross currently with the stream of heated air as the latter moves around and downwardly through the drier body to the bottom thereof, where the major portion of said milk powder will be separated from said air stream.

6. The method of spray drying in a drier body partially concentrated milk to a powder, comprising introducing tangentially into the upper portion of said drier body along a horizontal plane a rapidly moving stream of heated air so that said stream will move in a circular path around the upper portion of said drier body and in downward spirals through the lower portion of said body and will then rise through said body along the central axis thereof, and introducing a stream of concentrated milk in finely divided form along an approximately horizontal plane in the upper portion of said drier body into said air stream so that said milk particles will partially cross said air stream and will then be carried along by said air stream in its path to the lower portion of said drier body where the majority of the milk in powder form will be separated from said air stream.

7. The method of producing milk powder, comprising introducing a rapidly moving stream of air at a temperature of approximately 280° F.– 350° F. along a generally horizontal plane into a drier body so that the stream will first travel in a circular path in the upper portion of said body and will then move in downward spirals and will subsequently rise through the drier body along its central axis and simultaneously introducing a stream of milk at a temperature of approximately 120°–170° F. into said stream of heated air in the same horizontal plane so that the milk particles will first partially cross the stream of heated air, toward the periphery of the drier body, and will subsequently move parallel to said stream of air to the bottom of said drier body where the major portion of said milk powder will be separated from said air stream.

8. The method of producing milk powder, comprising introducing tangentially into the upper portion of an inverted conical type drier body along a horizontal plane a stream of air at a temperature of approximately 280° F.–350° F. having a velocity of approximately 2,000 feet per minute, whereby said stream will move in a circular path around the upper portion of said drier body and in downward spirals through the lower portion of said body and will then rise through said body along the central axis thereof and simultaneously introducing a spray of milk at a temperature of 120°–170° F. into the said upper portion of said drier body, toward the walls of said drier body, and with a component of motion in the direction of said air stream so that said milk spray will partially cross said air stream and will then be carried by said air stream in its path to the lower portion of said drier body where the major portion of the milk in powder form will be separated from said air stream.

9. In the production of dried or powdered milk from a homogenized concentrated milk having a solids content of the order of 50 percent, the steps of process comprising passing said concentrated milk at a pressure of many atmospheres to a vertically disposed conical type drier having its apex at the lower end thereof, spraying said concentrated milk, under said pressure, into said drier through nozzles located near the top and intermediate the center and periphery thereof, introducing a rapidly moving stream of air at a temperature of the order of 280° to 350° F., into said drier generally tangentially to the periphery thereof, said concentrated milk being sprayed in cross current relation to said incoming stream of air, said stream of air, introduced generally tangentially to the periphery of said drier, being introduced near the top thereof and in an approximately horizontal direction, the cross sectional dimensions of said air stream being generally those of a wide thin rectangle with the longer dimension located generally in a horizontal position and the shorter dimension in a generally vertical position, said concentrated milk being sprayed generally toward the periphery of said drier and against the edge or smaller dimension of said generally rectangular stream or moving body of heated air, so that particles of milk are carried into fresh sections of said body of heated air as they progress toward the periphery of said body of air, i. e. towards the walls of the said drier, thus effectively dissipating the envelope of moisture saturated air which tends to build up around drying milk particles and thereby accelerating the rate of drying, whereby the condensed milk is rapidly reduced to the dried, powdered state.

10. In the production of dried, powdered milk from concentrated milk, the steps of process comprising spraying said concentrated milk into a vertically disposed conical type drier having its apex at the lower end thereof, through nozzles located near the top and near the center thereof, in generally cross current relation to a rapidly moving stream of incoming air which has been filtered and reduced substantially in pathogenic organisms by heating, said stream of air being at a temperature of approximately 280° to 350° F., said stream of heated air being introduced into said drier near the top thereof and generally tangentially to the walls of said drier, in an approximately horizontal direction, and having a substantial dimension in the direction of the radii of said drier, said stream of air proceeding around and downwardly through said drier as a spiral, said concentrated milk being sprayed toward the walls of said drier, against and in cross current relation with said stream of heated air, so that particles of milk are carried into fresh sections of heated air as they progress toward the walls of said drier, the concentrated milk sprayed into the drier being converted into dried powdered milk within a small fraction of a minute, and air and water vapor leaving said drier by passing upwardly from its lower end along the central axis thereof and being withdrawn adjacent the top of the drier.

GEORGE TOOBY.

REFERENCES CITED

The following references are of record in the file of this patent:

UNITED STATES PATENTS

| Number | Name | Date |
|---|---|---|
| 1,282,093 | Lietzow et al. | Oct. 22, 1918 |
| 2,280,073 | Hall | Apr. 1, 1942 |
| 2,287,795 | Hall | June 30, 1942 |
| 1,215,889 | Stutzke | Feb. 13, 1917 |
| 878,977 | Merrell et al. | Feb. 11, 1908 |
| 999,707 | Ellis | Aug. 1, 1911 |

OTHER REFERENCES

Condensed Milk and Powder, Hunziker V. Edition 1935, Hunziker, La Grange, Illinois.